United States Patent
Schonlau et al.

(10) Patent No.: US 7,909,413 B2
(45) Date of Patent: Mar. 22, 2011

(54) HYDRAULIC UNIT

(75) Inventors: Jürgen Schonlau, Walluf (DE);
Manfred Rüffer, Sulzbach (DE); Jose Gonzales, Bad Oeynhausen (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 1100 days.

(21) Appl. No.: 11/629,066

(22) PCT Filed: Jun. 17, 2005

(86) PCT No.: PCT/EP2005/052831
§ 371 (c)(1),
(2), (4) Date: Dec. 8, 2006

(87) PCT Pub. No.: WO2005/123476
PCT Pub. Date: Dec. 29, 2005

(65) Prior Publication Data
US 2007/0240421 A1    Oct. 18, 2007

(30) Foreign Application Priority Data

Jun. 17, 2004 (DE) .......... 10 2004 029 115
Jun. 15, 2005 (DE) .......... 10 2005 027 768

(51) Int. Cl.
*B60T 13/46* (2006.01)
(52) U.S. Cl. .......... 303/12; 303/114.3; 303/115.3
(58) Field of Classification Search .......... 303/114.3, 303/115.2, 115.3, 113.1, 191, 12; 60/397, 60/411, 412, 486, 407, 409, 410
See application file for complete search history.

(56) References Cited

U.S. PATENT DOCUMENTS

| 4,738,112 | A | 4/1988 | Nomura et al. |
| 5,918,462 | A * | 7/1999 | Mitani .......... 60/397 |
| 6,301,883 | B1 * | 10/2001 | Fulks et al. .......... 60/397 |
| 6,324,845 | B1 | 12/2001 | Fulks et al. |
| 7,475,951 | B2 * | 1/2009 | Ichikawa .......... 303/12 |

FOREIGN PATENT DOCUMENTS

| DE | 3322176 | 1/1985 |
| DE | 4416833 | 11/1995 |
| DE | 19929880 | 1/2001 |
| EP | 0999109 | 5/2000 |
| FR | 2804926 | 8/2001 |

OTHER PUBLICATIONS

Patent Abstracts of Japan, publication No. JP 59 164252 A, Toyota Motor Corp, date of publication: Sep. 17, 1984.

* cited by examiner

*Primary Examiner* — Melanie Torres Williams

(57) ABSTRACT

The brake actuation device of a motor vehicle brake system includes a pneumatic brake booster 1, the interior of which is subdivided into at least one vacuum chamber and one working chamber, a master brake cylinder 2 and a pneumatic motor-and-pump assembly 3 for providing the vacuum in the vacuum chamber, which has a vacuum pump 6 and a motor 7 driving the vacuum pump 6. A vacuum level in the vacuum chamber or a difference in pressure between the vacuum chamber and the working chamber is sensed using a sensor 9, and the motor-and-pump assembly 3 is enabled by an electronic control unit 12 when the vacuum falls below a first defined bottom vacuum level Pe in the vacuum chamber and is disabled when a second defined top vacuum level Pa is reached.
The rotational speed np of the motor-and-pump assembly 3 is controlled depending on driving conditions of the vehicle.

12 Claims, 2 Drawing Sheets

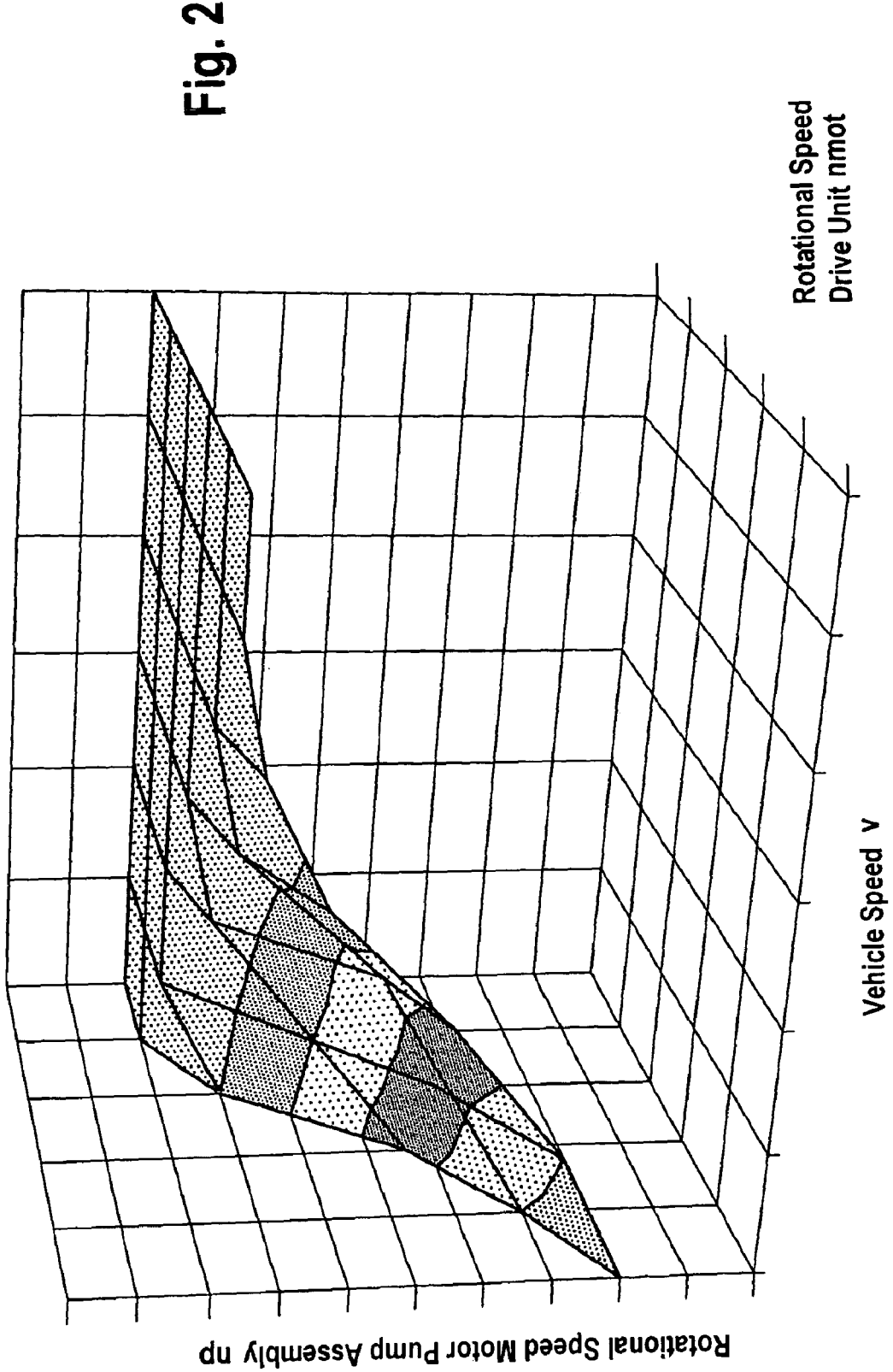

HYDRAULIC UNIT

BACKGROUND OF THE INVENTION

The present invention relates to a method for providing vacuum of a brake actuation device of a motor vehicle brake system comprising a pneumatic brake booster, the interior of which is subdivided into at least one vacuum chamber and one working chamber, a master brake cylinder and a pneumatic motor-and-pump assembly for providing the vacuum in the vacuum chamber, which comprises a vacuum pump and a motor driving the vacuum pump, wherein a vacuum level in the vacuum chamber or a difference in pressure between the vacuum chamber and the working chamber is sensed using a sensor, and the motor-and-pump assembly is enabled by an electronic control unit when the vacuum falls below a first defined bottom vacuum level in the vacuum chamber, and is disabled when a second defined top vacuum level is reached.

A method of this type is e.g. disclosed in DE 199 29 880 A1, wherein the vacuum pump is additionally activated in dependence on operating conditions of the driving unit. It is, however, considered disadvantageous that the activation and the operation of the vacuum pump in various driving conditions cause significant noise, which the driver of the vehicle feels as disturbing.

In view of the above, an object of the invention involves offering a method to solve the problem of minimizing the disturbing noise that develops due to the motor-and-pump assembly or of adapting it to driving conditions of the vehicle.

SUMMARY OF THE INVENTION

A method is proposed to achieve this object, the special characteristics of which resides in that a rotational speed of the motor-and-pump assembly is controlled depending on driving conditions of the vehicle. This provides the possibility of adapting the rotational speed of the motor-and-pump assembly to the vehicle noise level that prevails during the respective driving conditions, in order to prevent disturbing noise at all or allow only insignificant noise. In addition, this will avoid unnecessarily high load on the vehicle electric system.

Preferably, the rotational speed of the motor-and-pump assembly is controlled by an electronic pump control unit, which is connected by way of a bus system to an electronic motor control unit and a longitudinal-dynamics control unit of the vehicle. Hence, the vehicle conditions can be detected in a definite manner, and the motor-and-pump assembly can be actuated accordingly using the pump control unit.

In order to minimize disturbing noise before the start of a vehicle drive to the best possible, according to a favorable improvement of the method of the invention, the motor-and-pump assembly is switched on prior to the start of the vehicle drive and is operated at a minimum rotational speed when the vacuum level in the vacuum chamber is below the bottom vacuum level and as soon as a signal prevails, which indicates a possible start of the vehicle drive. A signal of this type can be produced, for example, by operating the door-opening sensor or when the vehicle is opened by operation of a central locking system. Other favorable embodiments arrange for the signal to be a brake light sensor signal or a signal of an electronically controlled acceleration device.

When the vehicle drive or the vehicle is in a start period, the motor-and-pump assembly is operated at a maximum rotational speed until the bottom vacuum level is reached, and is operated subsequently at a rotational speed that is optimized with respect to the noise level until the top vacuum level is reached. This will ensure that the bottom vacuum level is available to the brake booster within a reasonable time, and the top vacuum level is reached at an optimized rotational speed, i.e. adapted to the vehicle noise level. The start period is preferably detected by signals of wheel speed sensors and/or gear sensors.

According to a favorable improvement of the method of the invention, the rotational speed of the motor-and-pump assembly is further controlled depending on a speed of the vehicle. As this occurs, the longitudinal-dynamics control unit, which senses the speed, submits corresponding signals to the pump control unit.

Preferably, the rotational speed of the motor-and-pump assembly is synchronized with a rotational speed of the drive unit depending on the speed of the vehicle, in order to adapt the noise level of the motor-and-pump assembly to the noise level of the drive unit.

Until the top vacuum level is reached, the motor-and-pump assembly is advantageously operated at a rotational speed, which is synchronized with a rotational speed of the drive unit when the speed of the vehicle is below a defined speed, and is operated at a maximum rotational speed until the top vacuum level is reached, when the speed of the vehicle is above a defined speed.

A favorable embodiment of the method of the invention is described in more detail by way of the accompanying drawing.

BRIEF DESCRIPTION OF THE DRAWINGS

In the drawings,

FIG. 2 shows a characteristic diagram of the motor rotational speed relative to the pump rotational speed depending on a vehicle speed.

DETAILED DESCRIPTION OF THE DRAWINGS

Figure 1:
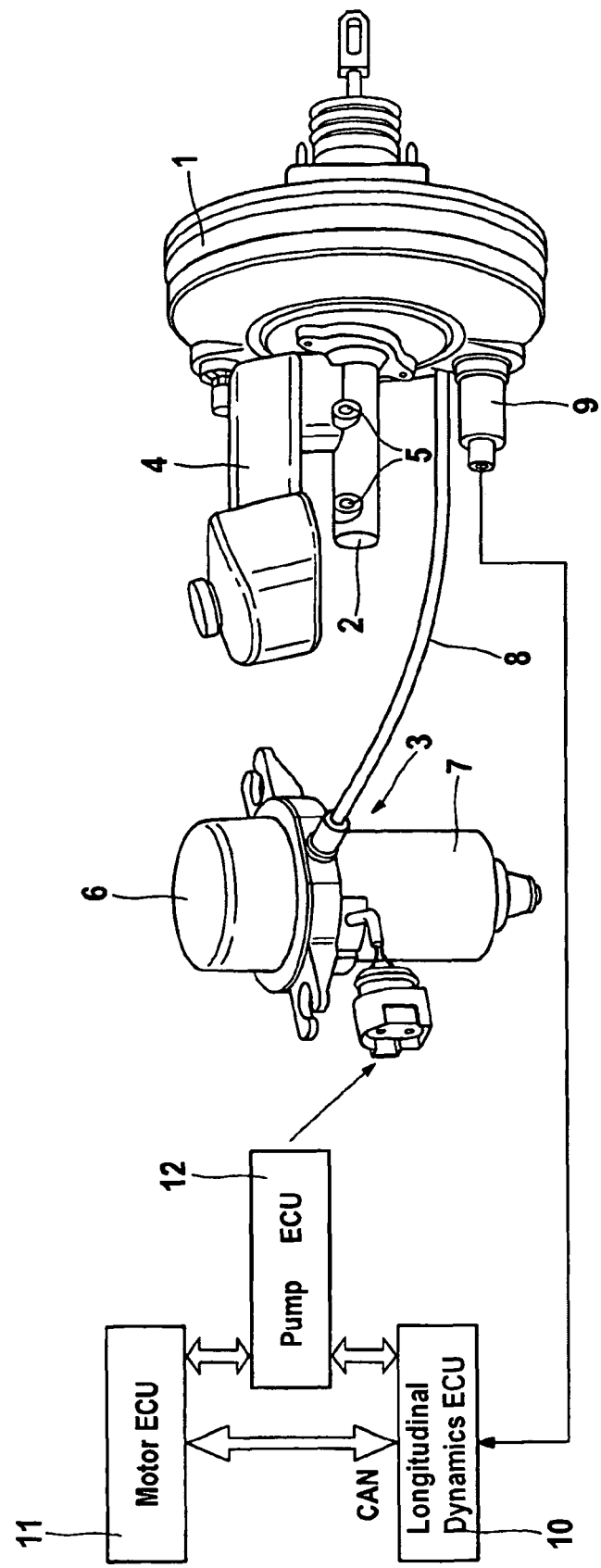
FIG. 1 shows a schematic system design of a brake actuation device of a motor vehicle brake system.

It can be seen in FIG. 1 that a brake actuation device for implementing the method of the invention comprises a pneumatic brake booster 1, a master brake cylinder 2 arranged thereon, and a pneumatic motor-and-pump assembly 3.

The principal design and the function of the brake actuation device are generally known in the art so that only the features that are essential for the invention are described hereinbelow.

An interior (not shown) of the brake booster 1 is subdivided by at least one movable wall into at least one vacuum chamber and at least one working chamber. The master brake cylinder 2 includes two pistons (not shown) which are displaceable in a housing and, together with the housing, delimit one hydraulic pressure chamber each. The pressure chambers are connectible to an unpressurized pressure fluid reservoir 4 and, through outlets 5, to wheel brakes (not shown) of the motor vehicle brake system. The motor-and-pump assembly 3 comprises a vacuum pump 6 and an electric motor 7 driving the vacuum pump 6. In order to provide the brake booster 1 with vacuum, the vacuum pump 6 connects to the vacuum chamber (not shown) of the brake booster 1 by way of a suction conduit 8. A vacuum sensor 9 arranged at the brake booster 1 or the vacuum pump 6 senses a vacuum level in the vacuum chamber or a difference in pressure between the vacuum chamber and the working chamber, and this sensed pressure is evaluated in an electronic longitudinal-dynamics control unit (longitudinal dynamics ECU) 10. Within the limits of the invention, the vacuum sensor 9 can also be arranged in the suction conduit 8.

The longitudinal-dynamics control unit 10, which senses a speed signal of wheel speed sensors (not shown) in addition to the pressure signal of the vacuum sensor 9, uses a bus system CAN (Controller Area Network) to connect to an electronic motor control unit (motor-ECU) 11, a pump control unit (pump-ECU) 12, and a principally known ABS control unit (ABS-ECU) (not shown). The motor-ECU 11 detects a rotational speed signal of a drive unit (motor) (not shown) of the vehicle. It is likewise feasible to control the motor-and-pump assembly 3 without a separate pump-ECU 12 by means of the ABS-ECU.

The motor-and-pump assembly 3 is enabled when the vacuum falls below a first defined bottom vacuum level Pe (roughly 0.6 bar vacuum), i.e. 0.4 bar absolute) in the vacuum chamber, which is required for the operation of the brake booster. The motor-and-pump assembly 3 is disabled when a second defined top vacuum level Pa (roughly 0.8 bar vacuum, i.e. 0.2 bar absolute) is reached, in order to reduce the load on the motor-and-pump assembly 3 and, hence, extend its useful life. This type of operation, however, causes an increase in noise and unnecessarily high load on the vehicle electric system.

To compensate the above-mentioned disadvantages, a rotational speed of the motor-and pump-assembly 3 is controlled according to the method of the invention by use of the pump-ECU 12 depending on driving conditions of the vehicle.

In particular before or during a start period of the vehicle or of the vehicle drive, the noises of the motor-and-pump assembly 3 are felt to be disturbing because there are not any driving noises yet. Therefore, the motor-and-pump assembly 3 is switched on before the vehicle drive starts and is operated at a minimum rotational speed $np_{min}$ when the vacuum level in the vacuum chamber is below the bottom vacuum level Pe and as soon as a signal prevails, which indicates a possible start of the vehicle drive. A signal of this type can be produced, for example, by operating the door-opening sensor or when the vehicle is opened by operation of a central locking system.

Other favorable embodiments e.g. arrange for the signal to be a brake light sensor signal or a signal of an electronically controlled acceleration device.

During a start period of the vehicle drive or of the vehicle, the motor-and-pump assembly 3 is operated at a maximum rotational speed $np_{max}$ until the bottom vacuum level Pe is reached, and is operated subsequently at a rotational speed $np_{opt}$ that is optimized with respect to the noise level until the top vacuum level Pa is reached. This will ensure that the bottom vacuum level Pe is made available to the brake booster within a reasonable time, and the top vacuum level Pa is reached at an optimized rotational speed, i.e. adapted to the noise level of the vehicle. The start period is then detected preferably by signals of wheel speed sensors and/or gear sensors.

As the noise level of the vehicle is also dependent on a speed v of the vehicle, the rotational speed np of the motor-and-pump assembly 3 is controlled-depending on the speed v of the vehicle, which is sensed in the longitudinal-dynamics ECU 10. To this end, corresponding signals are sent to the pump-ECU 12 using the bus system CAN.

For example, the rotational speed np of the motor-and-pump assembly 3 can be synchronized with a rotational speed nmot of the drive unit in order to adapt the noise level of the motor-and-pump assembly 3 to the noise level of the drive unit. Until the top vacuum level Pa is reached, the motor-and-pump assembly 3 is operated at a rotational speed np, which is synchronized with the rotational speed nmot of the drive unit when the speed v of the vehicle is below a defined speed $v_n$, e.g. 60 km/h. When the speed of the vehicle is above the defined speed $v_n$, the motor-and-pump assembly 3 is operated at a maximum rotational speed $np_{max}$ until the top vacuum level Pa is reached.

It is principally possible within the limits of the invention to actuate the motor-and-pump assembly 3 at a defined rotational speed as soon as major deceleration of the vehicle is detected in the longitudinal-dynamics ECU 10, for example, due to a signal of the vacuum sensor 9 or a pressure sensor (not shown), which is arranged in a brake conduit (not shown) in order to sense the pressure introduced by the driver.

It is furthermore feasible to operate the motor-and-pump assembly 3 at the maximum rotational speed $np_{max}$ until the bottom vacuum level Pe is reached, unless the bottom vacuum level Pe is reached in a short defined time despite the motor-and-pump assembly 3 being in operation, in order to safeguard the provision of the bottom vacuum level Pe in the vacuum chamber in the fastest possible time.

FIG. 2 shows a characteristic diagram of the motor rotational speed nmot relative to the pump rotational speed or the rotational speed np of the motor-and-pump assembly 3 depending on a vehicle speed.

In principle, the method of the invention is also applicable in a brake actuation device with an overpressure-operated brake booster that comprises a chamber of high pressure and a chamber of low pressure. In this arrangement, the brake actuation device includes a motor-and-pump assembly, which comprises a booster pump and an electric motor driving the booster pump. In order to provide the brake actuation device with the excess pressure, the booster pump communicates with the chamber of high pressure through a conduit. The booster pump is switched on and off depending on a pressure in the chamber of high pressure or depending on a difference in pressure between the two chambers, and the rotational speed of the motor-and-pump assembly is controlled in dependence on driving conditions of the vehicle according to the preceding description.

LIST OF REFERENCE NUMERALS 1 brake booster
2 master cylinder
3 motor-and-pump assembly
4 pressure fluid reservoir
5 outlet
6 vacuum pump
7 electric motor
8 suction conduit
9 vacuum sensor
10 longitudinal-dynamics control unit
11 motor control unit
12 pump control unit
nmot rotational speed of the drive unit
np rotational speed of the motor-and-pump assembly
$np_{opt}$ optimized rotational speed of the motor-and-pump assembly
$np_{max}$ maximum rotational speed of the motor-and-pump assembly
$np_{min}$ minimized rotational speed of the motor-and-pump assembly
Pa top vacuum level
Pe bottom vacuum level
V speed of the vehicle
$v_n$ defined speed of the vehicle

The invention claimed is:

1. A method for providing vacuum for a brake actuation device of a motor vehicle brake system comprising a pneumatic brake booster (1), the interior of which is subdivided into at least one vacuum chamber and one working chamber, the system further comprising a master brake cylinder (2) and a pneumatic motor-and-pump assembly (3) with a vacuum pump (6) and a motor (7) driving the vacuum pump (6), the method comprising the steps of sensing a vacuum level in the vacuum chamber or a difference in pressure between the vacuum chamber and the working chamber using a sensor (9), enabling the motor-and-pump assembly (3) by an electronic control unit (12) when the vacuum falls below a defined bottom vacuum level (Pe) in the vacuum chamber, controlling a rotational speed (np) of the motor-and-pump assembly (3) depending on driving conditions of the vehicle, and disabling the motor-and-pump assembly when a defined top vacuum level (Pa) is reached, wherein during a start period of the vehicle drive, the motor-and-pump assembly (3) is operated at a maximum rotational speed ($np_{max}$) until the defined bottom vacuum level (Pe) is reached, and is operated subsequently at an optimized rotational speed ($np_{opt}$) until the top vacuum level (Pa) is reached.

2. The method as claimed in claim 1,
wherein the rotational speed (np) of the motor-and-pump assembly (3) is controlled by an electronic pump control unit (12), which connects to an electronic motor control unit (11) and an electronic longitudinal-dynamics control unit (10) of the vehicle using a bus system.

3. The method as claimed in claim 1,
wherein the motor-and-pump assembly (3) is enabled before a vehicle drive is started and is operated at a minimum rotational speed ($np_{min}$) when the vacuum level in the vacuum chamber is below the bottom vacuum level (Pe) and as soon as a signal prevails, which is indicative of a possible start of the vehicle drive.

4. The method as claimed in claim 3,
wherein the signal is emitted by operation of a door-opening sensor.

5. The method as claimed in claim 3,
wherein the signal is emitted when the vehicle is opened by operation of a central locking system.

6. The method as claimed in claim 3,
wherein the signal is a brake light sensor signal.

7. The method as claimed in claim 3,
wherein the signal is a signal of an electronically controlled acceleration device.

8. The method as claimed in claim 1,
comprising the step of detecting the the start period by means of signals of wheel speed sensors and/or gear sensors.

9. A method for providing vacuum for a brake actuation device of a motor vehicle brake system comprising a pneumatic brake booster (1), the interior of which is subdivided into at least one vacuum chamber and one working chamber, the system further comprising a master brake cylinder (2) and a pneumatic motor-and-pump assembly (3) with a vacuum pump (6) and a motor (7) driving the vacuum pump (6), the method comprising the steps of sensing a vacuum level in the vacuum chamber or a difference in pressure between the vacuum chamber and the working chamber using a sensor (9), enabling the motor-and-pump assembly (3) by an electronic control unit (12) when the vacuum falls below a defined bottom vacuum level (Pe) in the vacuum chamber, controlling a rotational speed (np) of the motor-and-pump assembly (3) depending on driving conditions of the vehicle, and disabling the motor-and-pump assembly when a defined top vacuum level (Pa) is reached, wherein the rotational speed of the motor-and-pump assembly (3) is controlled depending on a speed (v) of the vehicle.

10. The method as claimed in claim 9,
wherein the rotational speed (np) of the motor-and-pump assembly (3) is synchronized with a rotational speed (nmot) of a drive unit.

11. The method as claimed in claim 10,
wherein, until the top vacuum level (Pa) is reached, the motor-and-pump assembly (3) is operated at a rotational speed (np), which is synchronized with the rotational speed (nmot) of the drive unit while the speed (v) of the vehicle is below a defined speed ($v_n$), and wherein the motor-and-pump assembly (3) is operated at a maximum rotational speed ($np_{max}$) until the top vacuum level (Pa) is reached, when the speed (v) of the vehicle is above a defined speed ($v_n$).

12. A method for providing vacuum for a brake actuation device of a motor vehicle brake system comprising a pneumatic brake booster (1), the interior of which is subdivided into at least one vacuum chamber and one working chamber, the system further comprising a master brake cylinder (2) and a pneumatic motor-and-pump assembly (3) with a vacuum pump (6) and a motor (7) driving the vacuum pump (6), the method comprising the steps of sensing a vacuum level in the vacuum chamber or a difference in pressure between the vacuum chamber and the working chamber using a sensor (9), enabling the motor-and-pump assembly (3) by an electronic control unit (12) when the vacuum falls below a defined bottom vacuum level (Pe) in the vacuum chamber, operating the motor-and-pump assembly (3) at a variable speed depending on driving conditions of the vehicle, and disabling the motor-and-pump assembly when a defined top vacuum level (Pa) is reached.

* * * * *